United States Patent
Hayasaka

(10) Patent No.: US 7,623,426 B2
(45) Date of Patent: Nov. 24, 2009

(54) OPTICAL DISK APPARATUS

(75) Inventor: Kaname Hayasaka, Iruma (JP)

(73) Assignee: TEAC Corporation, Tama-shi, Tokyo (JP)

( * ) Notice: Subject to any disclaimer, the term of this patent is extended or adjusted under 35 U.S.C. 154(b) by 984 days.

(21) Appl. No.: 11/236,362

(22) Filed: Sep. 27, 2005

(65) Prior Publication Data

US 2006/0069859 A1   Mar. 30, 2006

(30) Foreign Application Priority Data

Sep. 30, 2004   (JP)   ............................. 2004-287876

(51) Int. Cl.
*G11B 15/52*   (2006.01)
(52) U.S. Cl. .................. 369/47.33; 369/47.34
(58) Field of Classification Search .............. 369/47.33, 369/47.34
See application file for complete search history.

(56) References Cited

U.S. PATENT DOCUMENTS

| | | | | |
|---|---|---|---|---|
| 6,594,213 | B1 * | 7/2003 | Hayashi | 369/47.34 |
| 2002/0118617 | A1 * | 8/2002 | Hyun | 369/47.33 |
| 2004/0202073 | A1 * | 10/2004 | Lai et al. | 369/47.33 |
| 2005/0025011 | A1 * | 2/2005 | Gabryjelski | 369/47.33 |

FOREIGN PATENT DOCUMENTS

| | | |
|---|---|---|
| JP | 7-296507 | 11/1995 |
| JP | 8-123623 A | 5/1996 |
| JP | 9-91100 A | 4/1997 |
| JP | 11-25590 A | 1/1999 |
| JP | 2000-311433 A | 11/2000 |
| JP | 2001-290605 A | 10/2001 |
| JP | 2003-22653 A | 1/2003 |

OTHER PUBLICATIONS

Notice of Grounds for Rejection (JP) dated May 13, 2008, issued in corresponding Japanese Application No. 2004-287876.

* cited by examiner

*Primary Examiner*—Paul Huber
(74) *Attorney, Agent, or Firm*—Christensen O'Connor Johnson Kindness PLLC

(57) ABSTRACT

An optical disk apparatus which records data on the basis of a predetermined minimum amount of recording data. Recording data supplied from an external device is stored in a buffer memory and then encoded and recorded on an optical disk. The data is recorded in units of one ECC block (sixteen sectors). When the buffer memory has a free space corresponding to data amount of less than one ECC block, a system controller supplies a request for data in a data amount of the free space to the host device to store data corresponding to one ECC block in the buffer memory, as a result of which data filling by means of access to the optical disk is prevented.

5 Claims, 5 Drawing Sheets

OPTICAL DISK APPARATUS

BACKGROUND OF THE INVENTION

1. Field of the Invention

The present invention relates to an optical disk apparatus, and more specifically to memory control technology in an optical disk apparatus in which the minimum amount of data to be recorded is set.

2. Description of Related Art

When recording data onto an optical disk, recording data supplied from an external device such as a host device is temporarily stored in a buffer memory and the recording data stored in the buffer memory is then read out and supplied to an optical pickup. Here, because a DVD-RAM or the like has a sector format in which data is recorded for each ECC block (sixteen sectors), it is necessary to store recording data corresponding to sixteen sectors in a buffer memory.

Japanese Patent Laid-Open Publication No. Hei 7-296507 describes technology in which, when the buffer memory includes recording data having an amount which is less than the recording data unit in an optical magnetic disk, dummy data is added to thereby satisfy the unit data amount of the recording data.

In DVD-RAM drives, similar technology is known in which, when the buffer memory includes recording data having an amount which is less than the data amount corresponding to sixteen sectors, data which is already recorded in a DVD-RAM is read out and stored in the buffer memory, thereby satisfying the data amount corresponding to sixteen sectors.

FIGS. 7 and 8 schematically show a conventional method of storing recording data in a buffer memory 100. Here, it is assumed that the capacity of the buffer memory 100 corresponds to seven ECC blocks and that, with the length of data from a host device being 0X10, a plurality of sequential write commands are sequentially supplied from the host device with regard to the logical block address LBA of the buffer memory, starting from 0X1000E (hexadecimal representation). A controller of the optical disk apparatus, receiving a write command from the host device, sequentially stores the recording data which is received, in the logical block addresses 0X1000E to 0X1006D of the buffer memory 100. Then, when the controller sequentially receives the next write command from the host device, the buffer memory includes only a free space at the logical block addresses from 0X1006E to 0X1006F, which is not sufficient for storing the data length of 0X10. Accordingly, it is determined at this time that the buffer memory is FULL, and data reception from the host device is not performed. Consequently, as shown in FIG. 7, the buffer memory includes a free region from 0X10000 to 0X1000D (the region a) and a free region from 0X1006E to 0X1006F (the region b), in which the amount of the recording data stored would be below the data amount corresponding to sixteen sectors. With this state, it is not possible to record the recording data onto a DVD-RAM.

Accordingly, the controller, in order to fill the regions a and b, accesses addresses of a DVD-RAM corresponding to the respective regions, reads out data existing in the corresponding addresses, and stores the data which is read out into the buffer memory 100. FIG. 8 shows a state of the buffer memory 100 which is filled using the data which is read from the DVD-RAM. In this manner, the recording data corresponding to sixteen sectors is stored in the buffer memory 100, and the controller reads out the recording data in the units of sixteen sectors and supplies the data which is read to the optical pickup for recording the data onto the DVD-RAM.

With the above structure, however, each time the buffer memory 100 is determined to be FULL, it is necessary to read out data from a DVD-RAM so as to fill the buffer memory, and more specifically, it is necessary to perform the data read out operation twice so as to fill the top region and the end region of the buffer memory 100. This results in a problem that considerable time is required from when a write command is received until when recording of all the data is completed. In particular, with a recent trend of the increased capacity of the buffer memory 100, as the capacity is increased, the start address and the end address are located further apart and the addresses of the DVD-RAM which are read out are also further apart, resulting in an increase in time for completion of recording.

SUMMARY OF THE INVENTION

The present invention advantageously provides an apparatus in which time required for completion of recording of data which is supplied from an external device such as a host device can be reduced.

In accordance with one aspect of the present invention, there is provided an optical disk apparatus for recording data on an optical disk, comprising a buffer memory for temporarily storing data supplied from an external device, and control means which, when a capacity of a free region in the buffer memory is less than a predetermined minimum amount of recording data and an end logical address of data already stored in the buffer memory is consecutive to a start logical address of data to be supplied from the external device immediately after the data already stored, supplies a request for data corresponding to an amount of the free region of the buffer memory to the external device and stores data supplied from the external device in accordance with the request in the free region, thereby storing the minimum amount of recording data in the buffer memory.

According to the present invention, in response to a recording instruction provided from an external device, data supplied from the external device is stored in a buffer memory. At this time, when the free space of the buffer memory is less than the minimum amount of recording data, it is confirmed whether or not the logical address of data associated with the next recording instruction for which a process is requested by the external device is consecutive to the logical address of data which is already stored in the buffer memory immediately before (i.e. whether or not the write would be sequential), rather than always using data which is read from an optical disk to fill the free space, as in the related art. If the logical address of the data to be recorded is consecutive to that of the data stored in the buffer memory, a request for data by an amount corresponding to the free space remaining in the buffer memory is supplied to the external device, and the free space of the buffer memory is filled with such partial data, thereby satisfying the minimum amount of recording data. With regard to the data remaining in the host device as a result of supply of the partial data from the host device, the data which is already stored in the buffer memory is first recorded onto an optical disk to thereby secure a free space in the buffer memory, and the remaining data is then stored in the buffer memory. If a recording instruction with regard to which the logical address is not consecutive to the logical address of the immediately preceding data stored in the buffer memory is received, on the other hand, data corresponding to the data amount of the free space of the buffer memory is read from an optical disk and stored in the buffer memory to satisfy the minimum amount of recording data, and the data is then recorded on the optical disk, as in the related art. Further, when the buffer memory includes a free space after all the data is received in accordance with write commands and stored in the buffer memory, data is similarly read out from the optical disk at the address corresponding to the address of the free space and the data which is read out is stored in the buffer memory, thereby satisfying the minimum amount of recording data. Then, the data stored in the buffer memory is recorded on the optical disk. According to the present invention, with respect to a sequence of write commands with regard to which logical addresses of the buffer memory are consecutive, access to the optical disk is required only for filling the free space generated at the top portion of the buffer memory when the first write command is executed and the free space generated at the end portion of the buffer memory when the last write command is executed, whereby the number of access to the optical disk can be reduced to a greater extent as the capacity of data to be recorded increases.

According to the present invention, the number of access operations with respect to an optical disk is reduced because the amount of data to be recorded in the buffer memory is set to a minimum amount of recording data. Consequently, time required for recording data can be reduced, especially in the recording operation concerning an enormous amount of data.

BRIEF DESCRIPTION OF THE DRAWINGS

A preferred embodiment of the present invention will be described in detail based on the following figures, wherein.

DETAILED DESCRIPTION OF PREFERRED EMBODIMENT

A preferred embodiment of the present invention will be described in detail with reference to the accompanying drawings.

Figure 1:
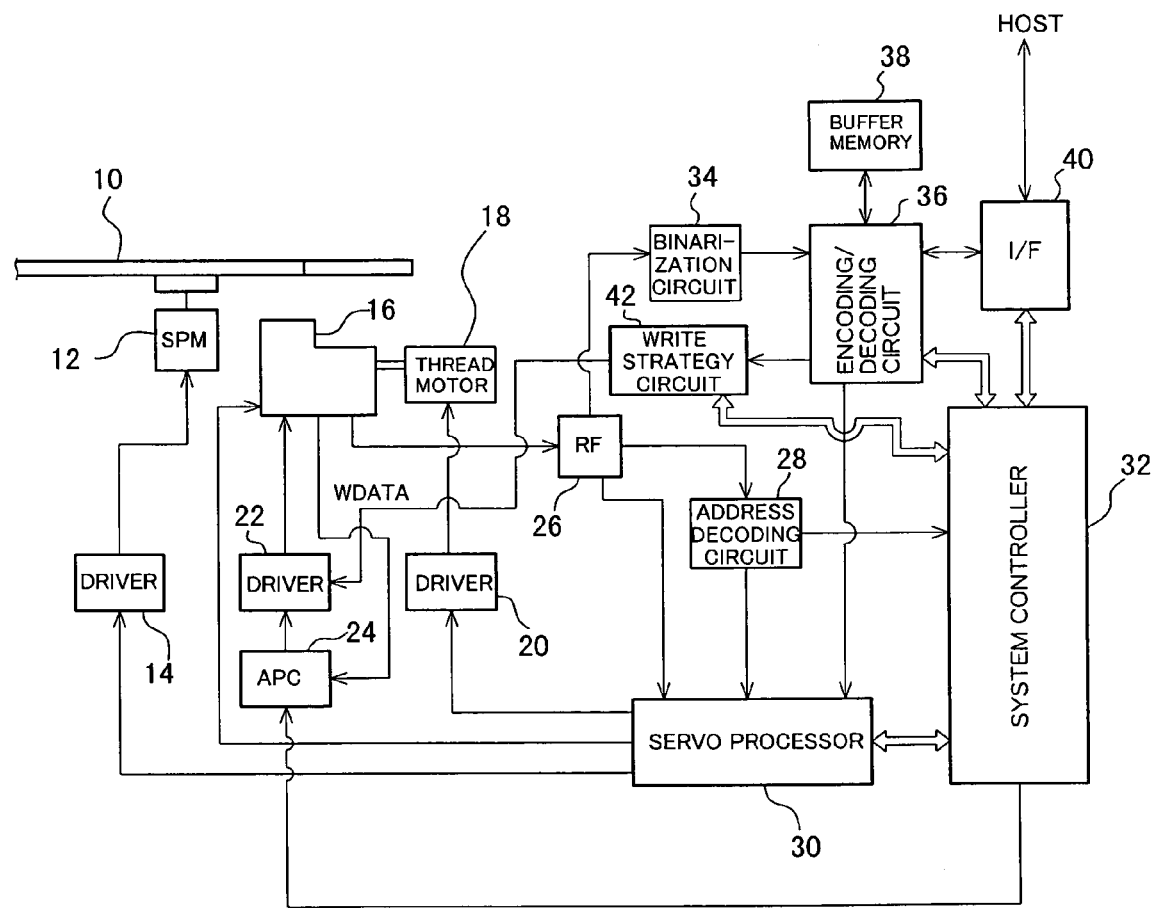
FIG. 1 is a view showing an overall structure of an optical disk apparatus according to the embodiment of the present invention.

FIG. 1 shows the overall structure of an optical disk apparatus according to the present embodiment. An optical disk 10 is rotated by a spindle motor (SPM) 12. The spindle motor SPM 12 is in turn driven by a driver 14, which, in turn, is servo-controlled by a servo processor 30 so as to operate at a desired rotation rate. In the example used to illustrate the present embodiment, the driver 14 divides the optical disk 10 into a plurality of zones from the inner radius to the outer radius, and drives the spindle motor SPM 12 so as to achieve a constant angular velocity in each zone (ZCLV).

An optical pickup 16, which includes a laser diode (LD) for irradiating laser light onto the optical disk 10 and a photo detector (PD) for receiving and converting light reflected from the optical disk 10 into an electric signal, is disposed opposite the optical disk 10. The optical pickup 16 is driven by a thread motor 18 in the radial direction of the optical disk 10. The thread motor 18 is driven by a driver 20, which is servo-controlled by the servo processor 30 in the same manner as the driver 14. Further, the LD of the optical pick-up 16 is driven by the driver 22, which is controlled by an auto power control circuit (APC) 24 such that a drive current assumes a desired value. Specifically, the APC 24 controls the drive current of the driver 22 such that it becomes the optimum recording power selected by OPC (Optimum Power Control) which is performed in a test area (PCA) of the optical disk 10. The OPC is a process in which test data is recorded on the PCA of the optical disk 10 while changing the recording power in a stepwise manner, and then the test data is reproduced for evaluation of the signal quality, so that the recording power with which the desirable signal quality can be obtained is selected. As an index of signal quality, a β value and a γ value, a degree of modulation, jitter, or the like is used.

When reproducing the data recorded on the optical disk 10, laser light of reproduction power is emitted from the LD of the optical pickup 16, and the light reflected on the disk is converted into an electrical signal by the PD and output. A reproduction signal from the optical pickup 16 is supplied to an RF circuit 26, which generates a focus error signal and a tracking error signal from the reproduction signal and supplies these signals to the servo processor 30. The servo processor 30 servo controls the optical pickup 16 based on these error signals and retains the optical pickup 16 in the on-focus and on-track conditions. Further, the RF circuit 26 supplies an address signal contained in the reproduction signal to an address decoder 28. The address decoder 28 demodulates the address signal to obtain address data of the optical disk 10, and supplies the demodulated data to the servo processor 30 and a system controller 32. In the case of a DVD-RAM, the address data can be obtained in the CAPA (Complimentary Allocated Pit Addressing) method, and the address data present in the header portion which is recorded in a sector is reproduced. Further, the RF circuit 26 supplies a reproduction RF signal to a binarization circuit 34. The binarization circuit 34 binarizes (digitizes as binary data) the reproduced signal and supplies the resulting signal subjected to 8/16 (eight to sixteen) modulation to an encode/decode circuit 36. The encode/decode circuit applies 8/16 demodulation and error correction to the binarized signal to obtain reproduced data, and outputs the reproduced data to a host device such as a personal computer via an interface I/F 40. Here, the encode/decode circuit 36 temporarily stores the reproduced data in the buffer memory 38 before the data is output to the host device.

On the other hand, for recording data onto the optical disk 10, data to be recorded is supplied from the host device to the encode/decode circuit 36 via the interface I/F 40. The encode/decode circuit 36 stores the data to be recorded in the buffer memory 38, and then encodes and supplies the data to be recorded, as 8/16 modulation data, to a write strategy circuit 42. The write strategy circuit 42 converts the modulation data into multipulses (a pulse train) in accordance with a predetermined recording strategy, and supplies the multi-pulses, as recording data, to the driver 22. The recording strategy is constituted by pulse widths of a leading pulse or subsequent pulses in multipulses and the pulse duty, for example. The recording strategy, which affects recording quality, is generally fixed to a certain optimum strategy, and may be set during optimum power control (OPC). Then, the laser light whose power was modulated according to the recording data is emitted from the LD of the optical pickup 16 onto the optical disk 10 for recording the data. After the data is recorded as described above, the optical pickup 16 emits laser light of reproducing power so as to reproduce the recorded data, and outputs the reproduced data to the RF circuit 26. The RF circuit 26 supplies the reproduced signal to the binarization circuit 34 where the data is binarized and subjected to 8/16 modulation and is supplied to the encode/decode circuit 36. The encode/decode circuit 36 decodes the 8/16 modulation data, and when decoding is not performed normally, performs an alternation operation. Specifically, the encode/decode circuit 36 records the recorded data which is stored in the buffer memory 38 in an alternative region.

With the structure as described above, in order to store recording data supplied from the host device in the buffer memory 38, the system controller 32, when the buffer memory 38 is determined to be FULL, confirms whether or not the logical address of write data associated with a next write command to be supplied from the host device is consecutive to the logical address of the immediately preceding data stored in the buffer memory 38, rather than reading out data from the optical disk 10 and storing the read data in the buffer memory to obtain data corresponding to sixteen sectors as in the related art. If the logical address of data to be recorded, which is to be supplied from the host device next, is consecutive to the logical address of data stored in the buffer memory 38, the system controller 32 supplies a request for some of the write data associated with the write command, only in an amount corresponding to a data amount of free space of the buffer memory 38, and stores the partial data in the buffer memory 38, thereby obtaining the recording data corresponding to sixteen sectors. After the recording data corresponding to sixteen sectors is stored in the buffer memory 38 and is then recorded on the optical disk 10, the remaining write data is received from the host device and stored in the free space of the buffer memory 38.

Figure 2:
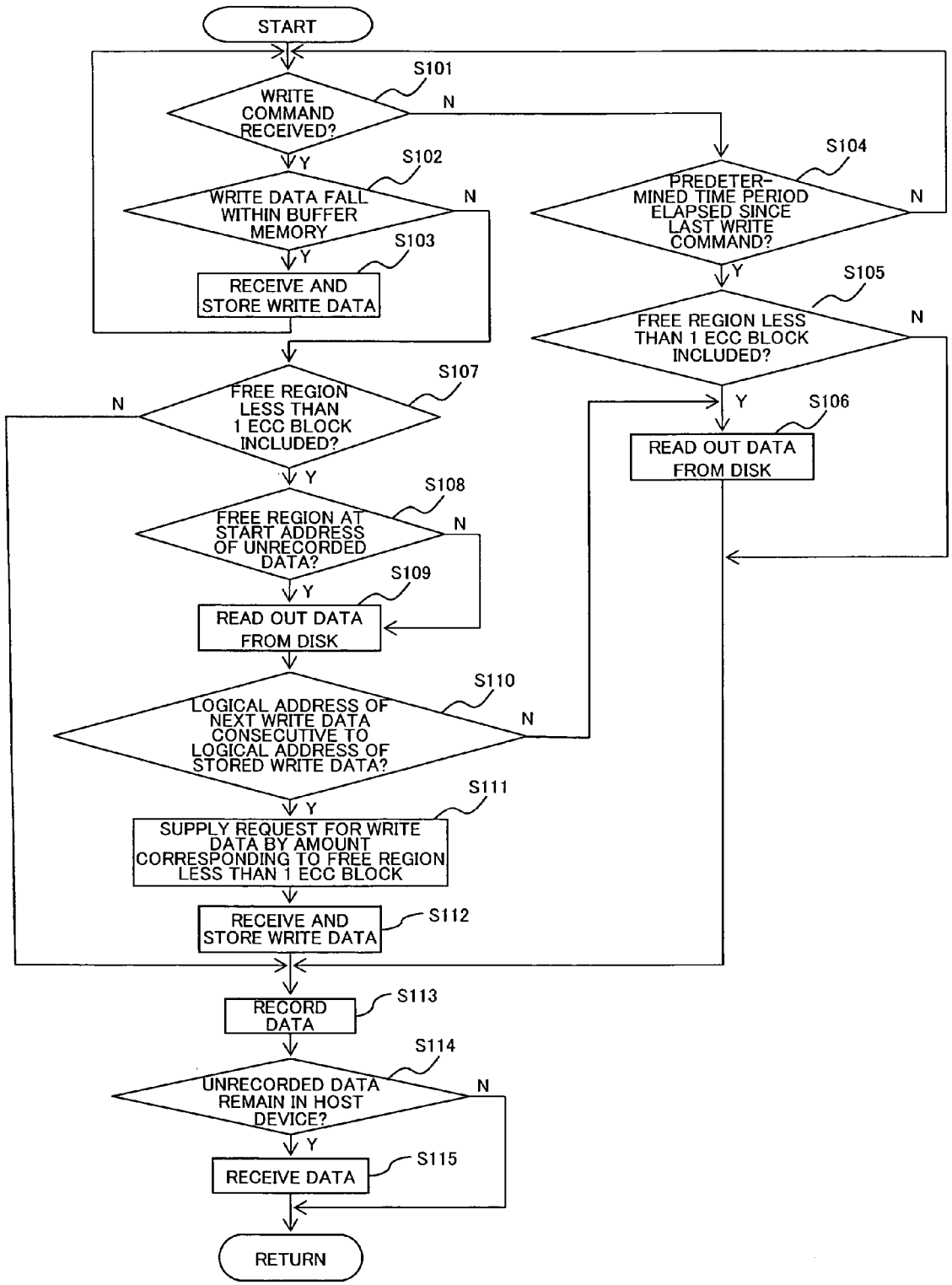
FIG. 2 is a process flowchart according to the embodiment of the present invention.

FIG. 2 shows a flowchart for controlling the buffer memory 38 by means of the system controller 32.

When a write command from the host device is received (S101), the system controller 32 computes a total amount of write data for which the host device requests recording, from a start logical address and an end logical address of the write data, and verifies whether or not the data amount can fall within the free region of the buffer memory 38 (S102). If it is determined that the amount of data can fall within the free region, the system controller 32 receives the write data and stores the data in the free region (S103). If a write command is not received at step S101, it is verified whether or not a predetermined period of time has elapsed since reception of the immediately preceding write command (S104). If one second has elapsed from the last write command, for example, the system controller 32, determining that various instructions will not be issued from the host device for some time, performs a recording operation of unrecorded write data which is stored in the buffer memory 38 onto the optical disk. Here, because, due to the restriction of DVD-RAM, each ECC block within the buffer memory 38 must be filled completely with write data so as to perform recording operation, it is confirmed whether or not the buffer memory 38 includes a free region corresponding to a data amount of less than one ECC block (S105). If such a free region exists, data on the optical disk at the address corresponding to the logical address of such a region must be maintained on the optical disk. Accordingly, the corresponding data is read from the optical disk and stored in the free region of the buffer memory 36 (S106), so as to allow completion of the write data for each ECC block within the buffer memory 38. Then, the write data is recorded on the optical disk (S113), thereby completing the operation.

If it is determined that the total amount of write data cannot fall within the free region of the buffer memory 38 at step S102, the process proceeds as follows. It is first confirmed whether or not the buffer memory 38 includes a free region corresponding to a data amount of less than one ECC block (S107). If no such free region exists, which means that the region within the buffer memory 38 is completely filled with unrecorded write data, the write data is recorded on the optical disk immediately (S113), thereby completing the operation. If the free region exists at step S107, on the other hand, it is then confirmed whether or not the free region corresponding a data amount of less than one ECC block exists at the start logical address of unrecorded data which has been received by the buffer memory (S108). If it is determined that there is such a free region, data on the optical disk at the address corresponding to the logical address of such a region must be maintained on the optical disk. Accordingly, the corresponding data is read out from the optical disk and stored in the free region of the buffer memory 38 (S109). Then, it is verified whether or not the start logical address of the write data, recording of which is requested by the host device, is consecutive to the end logical address of the latest unrecorded write data stored in the buffer memory 38 (S110). If these addresses are not successive, as it is necessary to read out the remaining data having consecutive logical addresses and record the data for each ECC block, an operation similar to that in step S106 is performed. If it is determined that the logical address is consecutive at step S110, it is determined to be preferable to read data from the host device rather than reading data from the optical disk. Accordingly, the system controller 32 issues a request for reading out some of the next write data which is to be supplied by the host device, by a data amount corresponding a free region less than one ECC block (S111), and stores the write data received from the host device in the free region of the buffer memory 38 (S112). When the buffer memory 38 is filled with unrecorded write data in units of each one ECC block, recording of the write data is performed (S113). Consequently, as no unrecorded data is stored in the buffer memory 38, a free region is regenerated for each ECC block in the buffer memory 38. If the host device still retains write data for which write commands have not been accomplished (S114), the system controller 32 receives such data for completion of the operation (S115). When write commands having successive logical addresses are sequentially received, a sequence of processes at steps S101, S102, and S103 are repeated until the buffer memory 38 is determined to be FULL. Once the buffer memory 38 is determined to be FULL, the process proceeds from step S102 sequentially to S107, S110, S111, S112, and S113, and the processes of FIG. 2 are restarted from the beginning of the flow. When the last of the sequential write commands is received at step S101, no write command is received for a while, and thus the process proceeds to step S104. After elapse of a predetermined time period, the process proceeds sequentially to S104, S105, S106, and S113, and all the write data remaining in the buffer memory 38 is recorded on the optical disk, thereby terminating the operation.

In the memory control method of the related art, each time the buffer memory 38 is determined to be FULL, the read out operation is performed twice with respect to the optical disk 10 so as to fill the free regions at the top and end portions of the buffer memory 38, and therefore the read out operation with respect to the optical disk 10 is necessary regarding not only the first and the last of sequential write commands but also an intermediate write command. According to the present embodiment, on the contrary, even in a case where the buffer memory 38 is determined to be FULL, when the logical address of the next data to be recorded is successive to the logical address of the data stored in the buffer memory, the end portion of the buffer memory is filled with data from the host device. This eliminates the need for accessing the optical disk 10 and thus makes it only necessary to read data from the optical disk only twice, i.e. regarding the first and the last of the sequential write commands.

While in the process shown in FIG. 2, after the optical disk 10 is accessed for data reading and the data which is read is then stored at step S109, a request for data corresponding to an amount of free region is supplied to the host device at step S111 and the data received is stored, a request for data corresponding to the size of a free region at the end portion of the buffer memory may be supplied to the host device and the received data may be stored before the optical disk 10 is accessed to read data and the data is stored in the free region at the top portion of the buffer memory.

Figure 7:
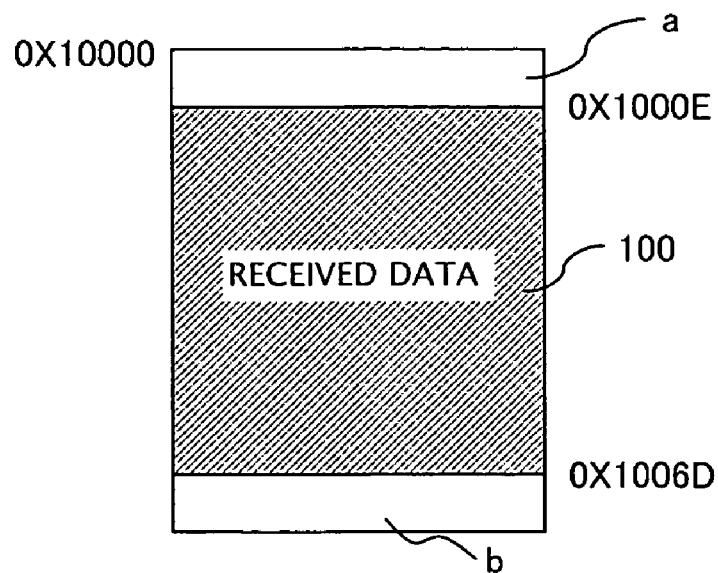
FIG. 7 is an explanatory view (No. 1) of data storage in the buffer memory in related art.
Figure 8:
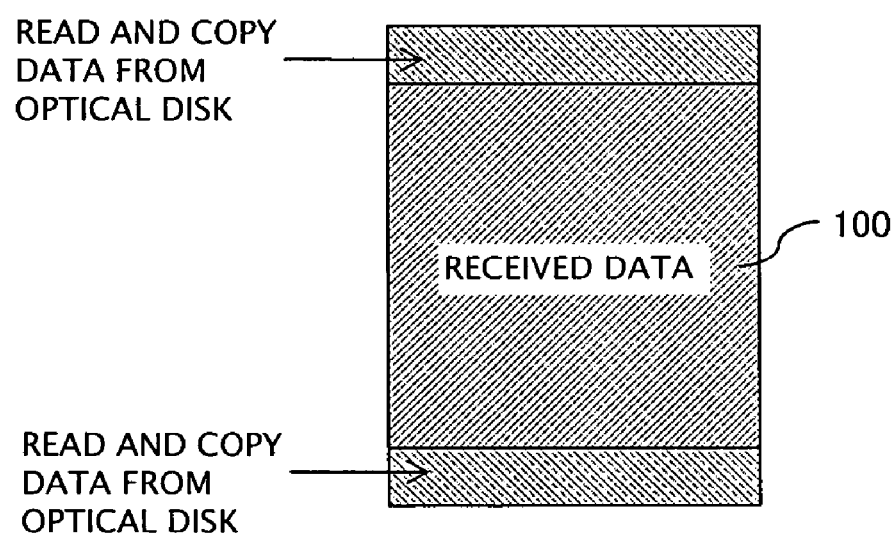
FIG. 8 is an explanatory view (No. 2) of data storage in the buffer memory in related art.

FIGS. 3 to 6 schematically show a data storing process with regard to the buffer memory 38 according to the present embodiment, and correspond to FIGS. 7 and 8 showing the process of the related art. For the purpose of comparison with the conventional process, it is assumed that data having a length of 0X10 supplied from the host device is stored in the buffer memory 38, starting from the logical block address (LBA) 0X1000E.

Figure 3:
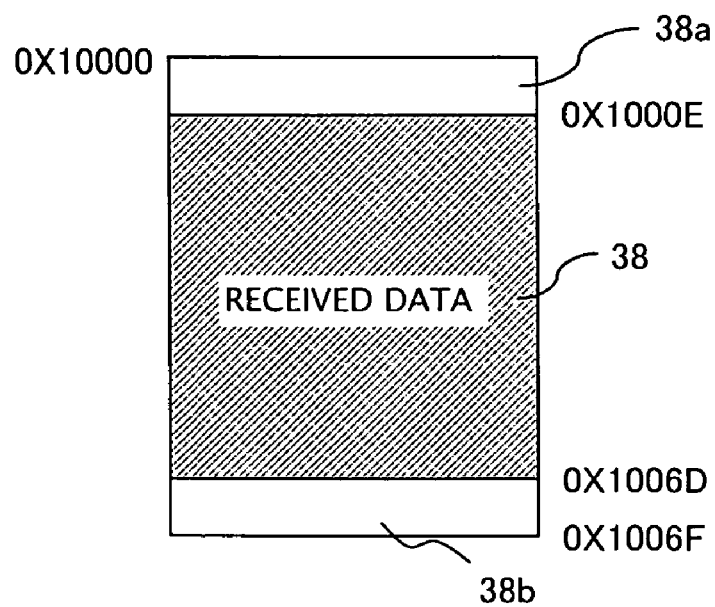
FIG. 3 is an explanatory view (No. 1) of data storage in the buffer memory.

Referring to FIG. 3, in accordance with sequential write commands, data is received and stored in the addresses from 0X1000E to 0X1006D of the buffer memory 38. As no capacity exists in the buffer memory 38 which can receive data having a length of 0X10 when the next write command is received, the buffer memory 38 is determined to be FULL. At this point in time, the buffer memory 38 includes a free region 38a from the address 0X10000 to the address 0X1000D at the top portion and a free region 38b from the address 0X1006E to the address 0X1006F at the end portion. Thus, the buffer memory 38 cannot store recording data corresponding to one ECC block (sixteen sectors) in each of the top and end portions, as a result of which recording of data cannot be performed in this state.

Figure 4:
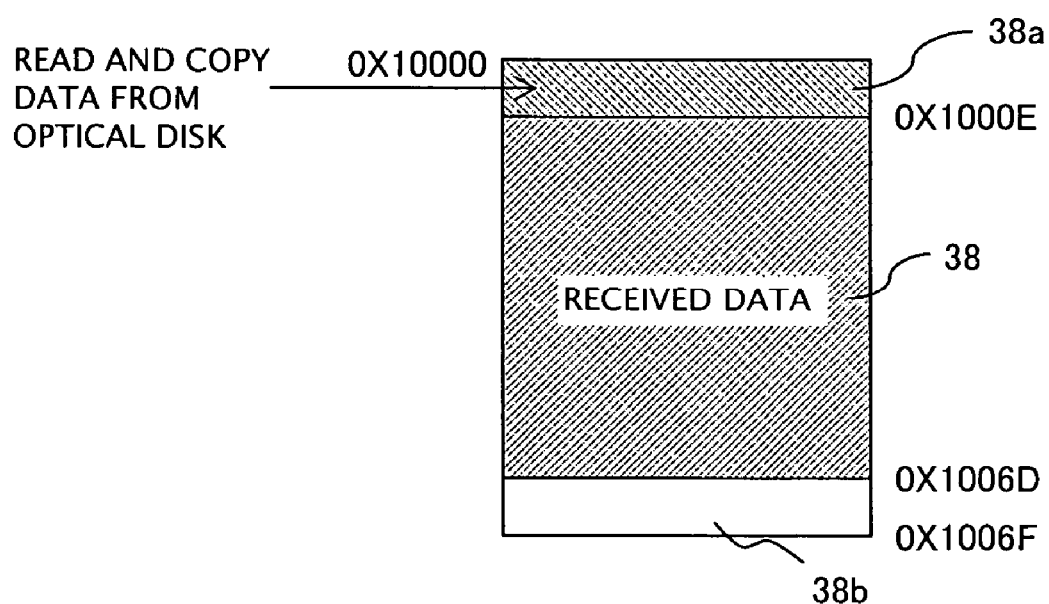
FIG. 4 is an explanatory view (No. 2) of data storage in the buffer memory.

Accordingly, as shown in FIG. 4, with regard to the free region 38a at the top of the buffer memory 38, the optical disk 10 is accessed at the corresponding address for reading data, and the data which is read is stored in the free region 38a to obtain data corresponding to one ECC block.

Figure 5:
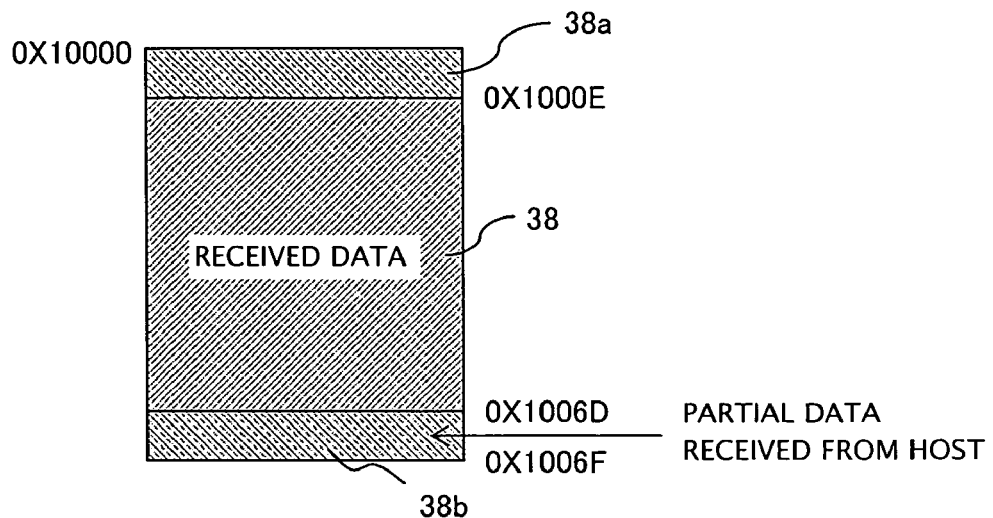
FIG. 5 is an explanatory view (No. 3) of data storage in the buffer memory.
Figure 6:
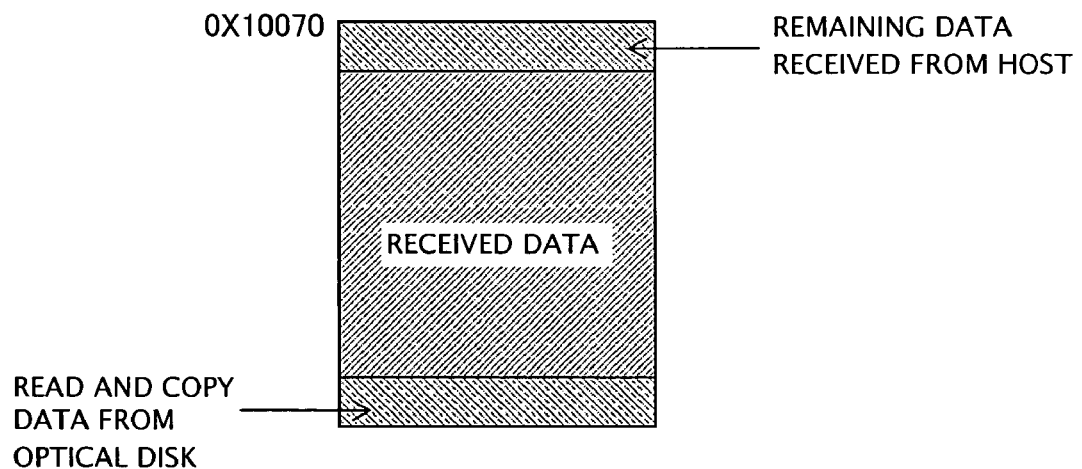
FIG. 6 is an explanatory view (No. 4) of data storage in the buffer memory.

Subsequently, as shown in FIG. 5, with regard to the free region 38b at the end portion of the buffer memory 38, a request for data corresponding to the capacity of the free region 38b is supplied to the host device and the partial data which is received from the host device is stored in the free region 38b to obtain data corresponding to one ECC block. Then, the recording data stored in the buffer memory 38 is read out for each ECC block and is recorded on the optical disk 10.

When recording of data onto the optical disk 10 is completed, the buffer memory 38 has a free region. Accordingly, a request for the remaining data is supplied to the host device and the remaining data received from the host device is sequentially stored in the buffer memory 38 starting from the start address. Subsequently, in accordance with a write command from the host device, the data is sequentially received and stored. After data in accordance with the last command of the sequential write commands is received, if there exists a free region having a capacity which is less than one ECC block at the end portion of the buffer memory 38, the optical disk 10 is accessed at the corresponding address for reading data therefrom, and the data which is read is stored in the free region.

It should be noted that, as can be seen from FIGS. 3 to 6, access to the optical disk 10 is performed only twice, i.e. with regard to the first and last write commands in a sequence of write commands. The present applicant has confirmed that the buffer memory control method of the present embodiment allows reduction in the number of access to the optical disk 10, which results in significant reduction in the time required for recording.

While an example in which sequential write commands are supplied has been described, reduction in the number of accesses to the optical disk 10 can be similarly achieved in the case of random write commands because the state of buffer FULL may occur depending on the data storage condition of the buffer memory 38 and the data length even in the case of random write commands.

Further, according to the present embodiment, because data is sequentially received from the host device and stored in the buffer memory 38 even in the state of buffer FULL, the number of recording operations with respect to the optical disk 10 can also be reduced.

While the preferred embodiment of the present invention has been described using specific terms, such description is for illustrative purposes only, and it is to be understood that changes and variations may be made without departing from the spirit or scope of the appended claims.

What is claimed is:

1. An optical disk apparatus for recording data on an optical disk, comprising:
    a buffer memory for temporarily storing data supplied from an external device; and
    control means which, when a capacity of a free region in the buffer memory is less than a predetermined minimum amount of recording data and an end logical address of data already stored in the buffer memory is consecutive to a start logical address of data to be supplied from the external device immediately after the data already stored, supplies a request for data corresponding to a size of the free region of the buffer memory to the external device and stores data supplied from the external device in accordance with the request in the free region, thereby storing the minimum amount of recording data in the buffer memory.

2. An optical disk apparatus according to claim 1, wherein after the data stored in the buffer memory is read out from the buffer memory and recording of the data which is read out onto the optical disk is completed, the control means stores data remaining in the external device as a result of supply of the data corresponding to a size of the free region of the buffer memory from the external device in the buffer memory.

3. An optical disk apparatus according to claim 1, wherein when the buffer memory includes a free region at the top portion thereof, the control means stores data of the optical disk having an address corresponding to an address of the free region, which is read out from the optical disk, in the free region of the buffer memory.

4. An optical disk apparatus according to claim 2, wherein when all the data which is supplied from the external device is stored in the buffer memory and the buffer memory includes a free region at the end portion thereof, the control means stores data having an address corresponding to the free region, which is read from the optical disk, in the free region of the buffer memory.

5. An optical disk apparatus for sequentially recording data on an optical disk in accordance with sequential write commands provided from an external device, the optical disk apparatus comprising:

a buffer memory for temporarily storing data supplied from the external device; and controller which, in a case where data is stored in the buffer memory in accordance with a first write command, when a capacity of a free region generated at the end portion of the buffer memory is less than a predetermined minimum amount of recording data and also an end logical address of data already stored in the buffer memory is consecutive to a start logical address of data to be supplied from the external device immediately after the data already stored, receives data corresponding to a data amount of the free region from the external device and stores data received from the external device in the free region, and when a capacity of a free region generated at the top portion of the buffer memory is less than the predetermined minimum amount of recording data, stores data of the optical disk having an address corresponding to an address of the free region which is read from the optical disk in the free region, thereby storing the minimum amount of recording data in the buffer memory, the controller then recording data stored in the buffer memory in the optical disk, and subsequently receiving data remaining in the external device as a result of supply of data corresponding to a data amount of the free region and storing the data which is received in the buffer memory, and which, in a case where data is stored in the buffer memory in accordance with a last write command, when a capacity of a free region generated at the end portion of the buffer memory is less than the predetermined minimum amount of recording data, stores data of the optical disk having an address corresponding to an address of the free region which is read from the optical disk in the free region.

* * * * *